US007680871B2

(12) United States Patent
Lauter et al.

(10) Patent No.: US 7,680,871 B2
(45) Date of Patent: Mar. 16, 2010

(54) APPROXIMATING FUNCTION PROPERTIES WITH EXPANDER GRAPHS

(75) Inventors: Kristin E Lauter, La Jolla, CA (US); Denis X. Charles, Redmond, WA (US); Eyal Zvi Goren, Montreal (CA)

(73) Assignee: Microsoft Corporation, Redmond, WA (US)

( * ) Notice: Subject to any disclaimer, the term of this patent is extended or adjusted under 35 U.S.C. 154(b) by 1093 days.

(21) Appl. No.: 11/275,625

(22) Filed: Jan. 19, 2006

(65) Prior Publication Data

US 2007/0180012 A1    Aug. 2, 2007

(51) Int. Cl.
*G06F 17/10* (2006.01)
(52) U.S. Cl. ...................................... 708/445
(58) Field of Classification Search ........................ None
See application file for complete search history.

(56) References Cited

U.S. PATENT DOCUMENTS

| 7,174,495 | B2 * | 2/2007 | Boutillon et al. ............ 714/752 |
| 7,382,876 | B2 * | 6/2008 | Lauter et al. .................. 380/28 |
| 2007/0098150 | A1 * | 5/2007 | Lauter et al. .................. 380/28 |
| 2007/0165846 | A1 * | 7/2007 | Lauter et al. .................. 380/46 |
| 2008/0155520 | A1 * | 6/2008 | Meloche et al. ............. 717/157 |

* cited by examiner

*Primary Examiner*—David H Malzahn
(74) *Attorney, Agent, or Firm*—Lee & Hayes, PLLC

(57) ABSTRACT

Function properties may be approximated using an expander graph. For example, an approximate average of a function may be determined by randomly exploring an expander graph. Values of the function are associated with vertices of the expander graph. The expander graph is randomly explored by traversing edges and encountering vertices. The exploration may comprise a crawl, a walk, and so forth. An approximate average of the function is determined based on the function values that are associated with encountered vertices.

20 Claims, 8 Drawing Sheets ical computation required to determine a true average may be too great in terms of time and/or processing resources, especially when the number of values in the set is tremendous (e.g., when there are billions or trillions of values) and/or when the computation is complex. Additionally, it may be financially cost prohibitive to secure each and every value of a function, especially when investigation or research is required (e.g., when millions of people would need to be polled for information).
APPROXIMATING FUNCTION PROPERTIES WITH EXPANDER GRAPHS

BACKGROUND

In many circumstances, the average value of a function is desired for some purpose. Averages may often be determined directly using each possible value of the function. However, determining averages directly may sometimes be impossible. Moreover, there are times when directly determining an average is possible, but it is not reasonable or feasible to do so. For example, the mathematical computation required to determine a true average may be too great in terms of time and/or processing resources, especially when the number of values in the set is tremendous (e.g., when there are billions or trillions of values) and/or when the computation is complex. Additionally, it may be financially cost prohibitive to secure each and every value of a function, especially when investigation or research is required (e.g., when millions of people would need to be polled for information).

Accordingly, an approximate average of a function is substituted from time to time for the true average. An approximate average of a function is computed using fewer than all of the actual values in the total set of values of the function.

SUMMARY

Function properties may be approximated using an expander graph. For example, an approximate average of a function may be determined by randomly exploring an expander graph. Values of the function are associated with vertices of the expander graph. The expander graph is randomly explored by traversing edges and encountering vertices. The exploration may comprise a crawl, a walk, and so forth. An approximate average of the function is determined based on the function values that are associated with encountered vertices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

As described herein, approximate averages of functions may be determined using an expander graph. By way of example only, respective values of a function are associated with respective vertices of an expander graph. An exploration of the expander graph produces selected values that are a subset of the total data set for the function. The selected values of the subset may be utilized to calculate an approximate average.

Three sections are included below. One section pertains to a relatively qualitative description of approximating properties of functions with expander graphs, and another section pertains to a relatively quantitative description of approximating properties of functions with expander graphs. The first section is entitled "Example Qualitative Implementations for Approximate Averaging with Expander Graphs". The second section is entitled "Example Quantitative Implementations for Approximate Averaging with Expander Graphs". There is also a third section that extends the described schemes, approaches, etc. to properties of functions besides the average. This section is entitled "Approximating General Function Properties with Expander Graphs".

Figure 1:
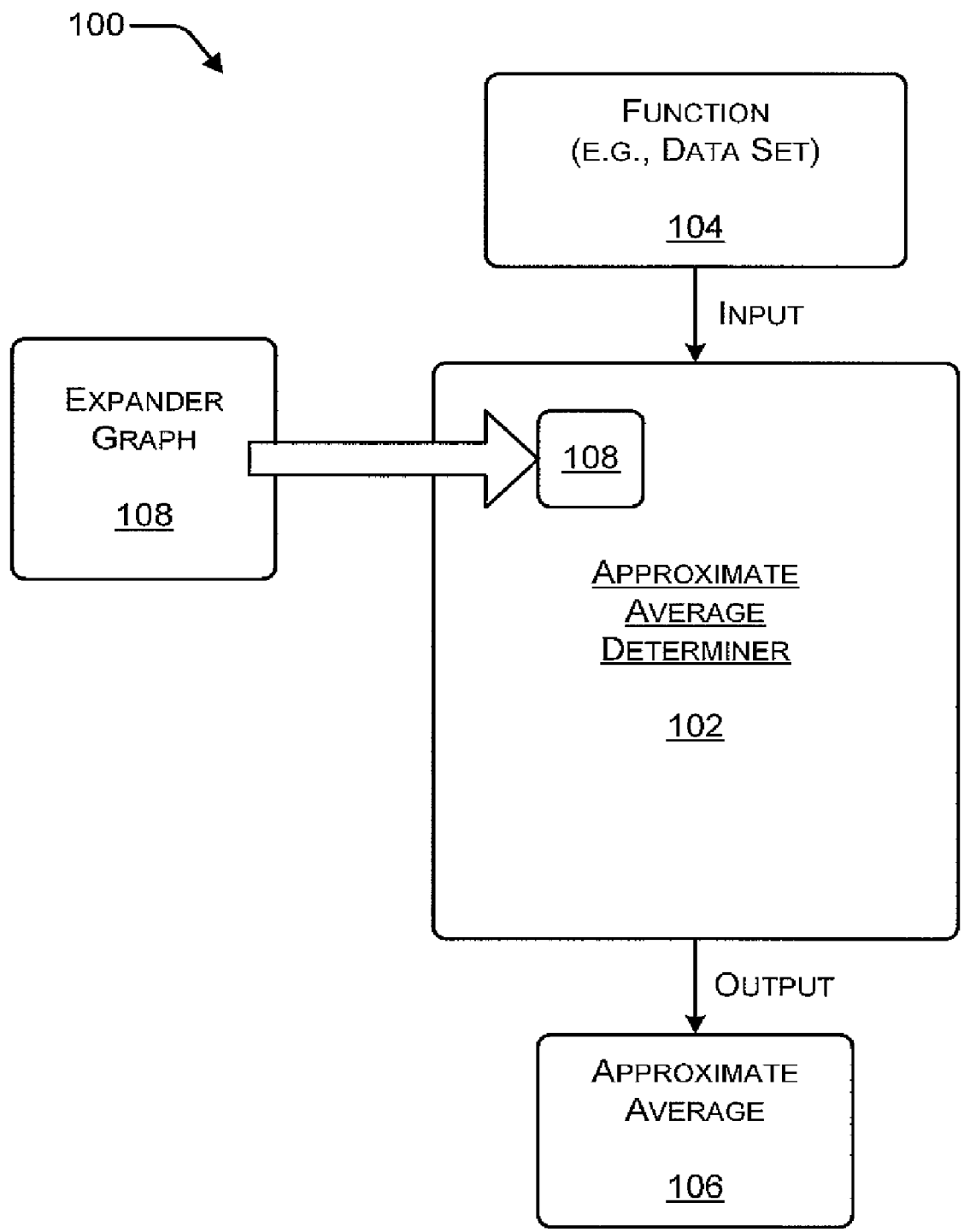
FIG. 1 is a block diagram of an example approximate average determiner that utilizes an expander graph.

Example Qualitative Implementations for Approximate Averaging with Expander Graphs FIG. 1 is a block diagram 100 of an example approximate average determiner 102 that utilizes an expander graph 108. As illustrated, block diagram 100 includes approximate average determiner 102, a function 104, an approximate average 106, and expander graph 108. In a described implementation, approximate average determiner 102 receives function 104 as input and produces approximate average 106 as output by utilizing expander graph 108. Approximate average determiner 102 may be realized as hardware, software, firmware, some combination thereof, and so forth.

More specifically, approximate average determiner 102 receives at least a portion of function 104 and/or a description of function 104. Function 104 may be considered to adhere to the following example description: functions are of the form $f:D \rightarrow R$, where D is a finite set and R is the set of real numbers. In real-world applications, the values of a function typically have some attribute in common. For example, a set of values of a function may have the same origin, such as being from the same program, file, or survey. Alternatively, each value of a set of values may represent the same real-world variable or parameter, such as age, income, or mortgage payment. The values of data sets for functions may alternatively share some other attribute or attributes.

Expander graph 108 is a collection of vertices or nodes and a collection of edges. The edges interconnect the vertices. An exploration of expander graph 108 is effected by traversing the edges between vertices. As is described more fully herein below, an expander graph exploration may be a walk on an expander graph, a crawl on an expander graph, and so forth.

Individual values of function 104 are associated with individual vertices of expander graph 108. An exploration of expander graph 108 involves traversing edges to reach vertices. The values associated with traversed vertices are selected for determining an approximate average. A random seed (not explicitly shown in FIG. 1) may be used to determine the path of the exploration on expander graph 108.

An example of an expander graph 108 is described herein below with particular reference to FIG. 2. Examples of explorations of an expander graph 108 are also described. The examples include an example of a walk and a crawl on an expander graph 108. A crawl on an expander graph 108 is described in more detail herein below with particular reference to FIGS. 4 and 5. A walk on an expander graph 108 is described in more detail herein below with particular reference to FIGS. 6 and 7.

Generally, any type of expander graph 108 may be employed by approximate average determiner 102. Expander graphs are usually characterized as having a property that enables them to grow relatively quickly from a given vertex to its neighbor vertices and onward to still other vertices. An example of a family of graphs that are considered to have good expansion properties are the so-called Ramanujan graphs. Although not required, approximate averaging with an expander graph is facilitated by using an expander graph with good expansion properties.

The degree (k) indicates the number of edges emanating from a given vertex. Although not required, expander graphs that are so-called k-regular graphs are particularly amenable for use in determining approximate averages. Such k-regular graphs are graphs that have the same number of edges emanating from each vertex. Moreover, two specific types of k-regular graphs are particularly amenable for use in determining approximate averages. These two examples of k-regular graph types are (i) supersingular elliptic curves expander graphs and (ii) Lubotzky-Philips-Sarnak (LPS) expander graphs. These two specific k-regular expander graph types, which are also examples of Ramanujan graphs, are described mathematically herein below in the quantitative section.

Figure 2:
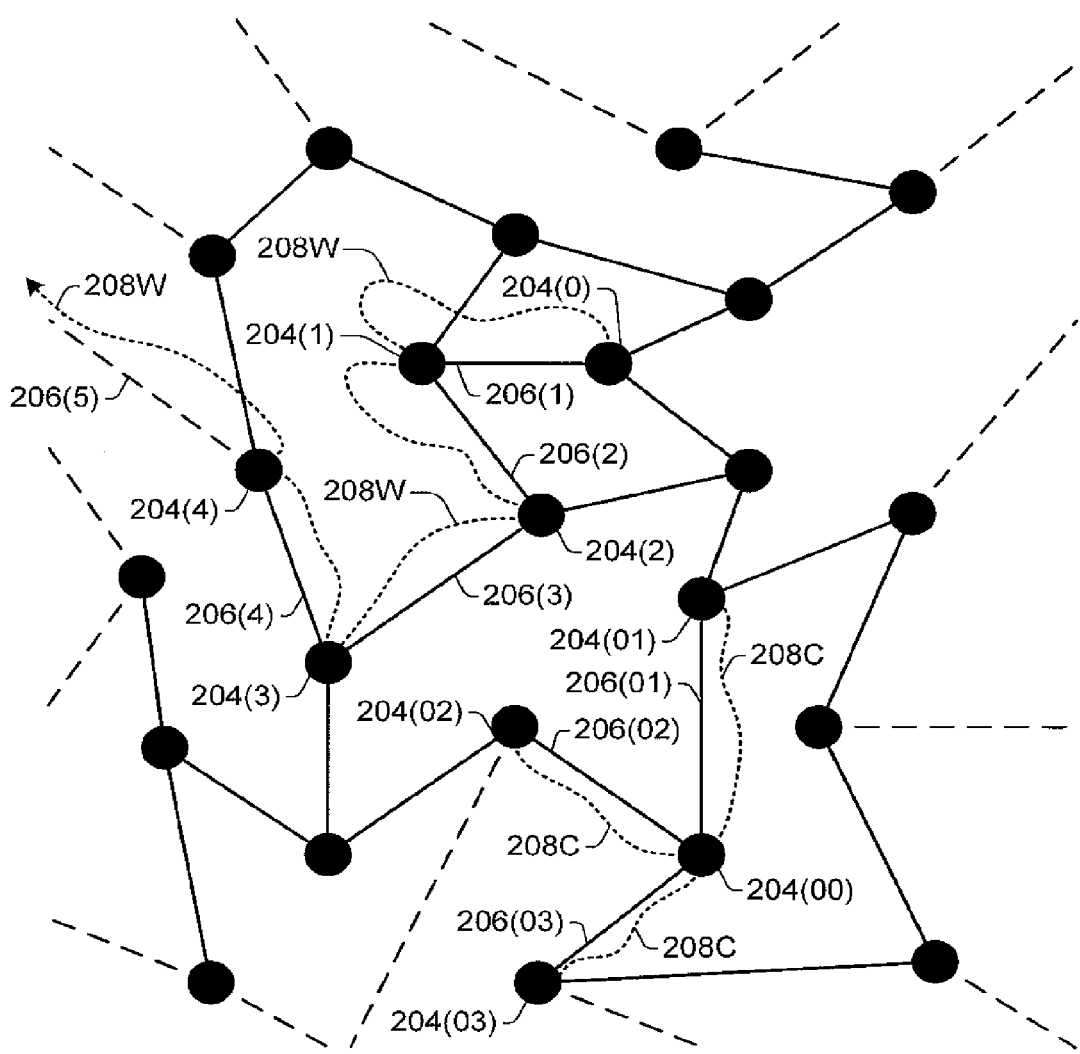
FIG. 2 illustrates an example expander graph along with example approaches to exploring an expander graph.

FIG. 2 illustrates an example expander graph 108(2) along with example approaches to exploring an expander graph. A legend 202 indicates that each black circle represents a vertex or node 204, that each solid line represents an edge 206, and that short-dashed lines represent example explorations 208. The example exploration approaches 208 that are illustrated include a walk 208W and a crawl 208C.

As is apparent from FIG. 2, each edge 206 interconnects two vertices 204. Only a portion of the overall example expander graph 108(2) is shown in FIG. 2 due to space limitations. An actual expander graph 108 may be much larger in practice. This is represented in expander graph 108(2) by the long-dashed lines emanating from some vertices 204 and extending outward to terminate at unseen vertices 204.

As illustrated, expander graph 108(2) is a k-regular graph with k=3. In other words, each vertex 204 has three edges 206 extending there from and therefore terminating thereat, depending on perspective and the direction of the exploration. Hence, each vertex 204 is directly connected to three other neighbor vertices 204. Although a k=3 regular graph is used as an example herein, k may take any integer value (especially of three or larger).

An example walk 208W and an example crawl 208C are both illustrated on expander graph 108(2). A crawl entails a pair-wise independent sampling of a subset of the neighbors of a selected vertex. Generally, a crawl 208C is shown as starting at vertex 204(00) and extending to one or more directly-connected neighbor vertices 204. A crawl 208C may include up to all of the neighbor vertices of the starting vertex 204(00). Specifically, crawl 208C traverses edge 206(01) to reach vertex 204(01). After returning to starting vertex 204(00), crawl 208C traverses edge 206(02) to reach vertex 204(02). After again returning to vertex 204(00), crawl 208C traverses edge 206(03) to reach vertex 204(03).

In a described implementation, a crawl 208C involves traversing edges 206 extending from a starting vertex 204 to one or more neighbor vertices 204. Although the example crawl 208C on expander graph 108(2) embraces each vertex 204(01) to 204(03) that is directly connected to the starting vertex 204(00), crawls around expander graphs may embrace fewer than all of the neighbor vertices of a starting vertex. The number of neighbor vertices 204 that are included in a crawl 208C is dependent on a number of factors that impact the approximate average determination, as is described herein below. An input seed is used to select a next edge 206 to be traversed to reach a next neighbor vertex 204 of a given crawl 208C. Effecting a crawl 208C on an expander graph 108 is described further below with particular reference to FIGS. 4 and 5.

A walk entails sampling vertices as edges of the expander graph are traversed one after the other. Generally, a walk 208W is shown starting at vertex 204(0) and extending beyond vertex 204(4). Specifically, example walk 208W traverses edges 206(1) to 206(5) and includes vertices 204(0) to 204(4). Walk 208W starts at vertex 204(0) and traverses edge 206(1) to reach vertex 204(1). From vertex 204(1), walk 208W traverses edge 206(2) to reach vertex 204(2). From vertex 204(2), walk 208W traverses edge 206(3) to reach vertex 204(3). From vertex 204(3), walk 208W traverses edge 206(4) to reach vertex 204(4). From vertex 204(4), walk 208W traverses edge 206(5) to reach a vertex 204(5) (not explicitly shown in FIG. 2).

In a described implementation, walk 208W can continue traversing edges 206 to include other vertices 204 in walk 208W as long as an input seed may be used to provide direction for the walk. The desired length of a walk 208W is dependent on a number of factors that impact the approximate average determination, as is described herein below. The seed is used to select a next edge 206 to be traversed to reach a next vertex 204 from a given current vertex 204. With three edges 206 emanating from each vertex 204 in expander graph 108(2), there are three options for a next step or leg of a walk 208W. Hence, with a k=3 regular graph, two bits from an input seed are used for each next edge or step determination. Creating a walk 208W on an expander graph 108 is described further below with particular reference to FIGS. 6 and 7.

Figure 3:
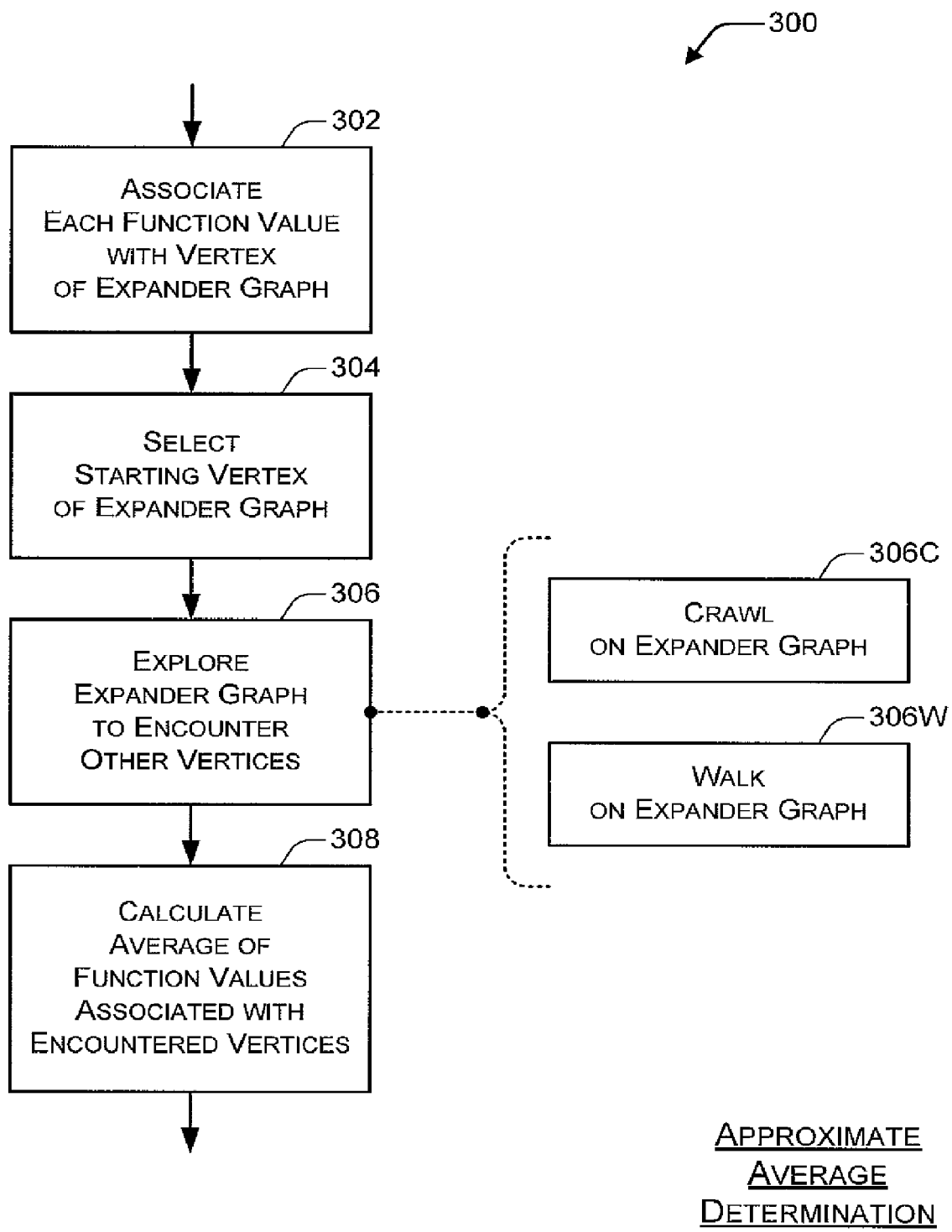
FIG. 3 is a flow diagram that illustrates an example of a method for determining an approximate average by exploring an expander graph.

FIG. 3 is a flow diagram 300 that illustrates an example of a method for determining an approximate average by exploring an expander graph. Flow diagram 300 includes four (4) "primary" blocks 302-308 and two (2) "secondary" blocks 306C and 306W. The approximate average determination method of flow diagram 300 pertains generally to explorations of expander graphs. Specific example methods of crawling around an expander graph and of walking on an expander graph are described herein below with particular reference to FIGS. 5 and 7, respectively.

Although the actions of flow diagram 300 may be performed in other environments and with a variety of hardware and software combinations, a device 802 that is described herein below with particular reference to FIG. 8 may be used to implement the method of flow diagram 300. For example, approximate average determiner 102 as embodied in processor-executable instructions 810 may implement the described actions. Other figures that are described herein above are referenced to further explain an example of the method. For example, an approximate average determiner 102 may implement the method using an expander graph 108 (of FIGS. 1 and 2).

At block 302, each function value is associated with a vertex of an expander graph. For example, each respective value from a data set of a function 104 may be associated with a respective vertex 204 of an expander graph 108. At block 304, a starting vertex is selected from the expander graph. For example, a starting vertex 204 for an exploration 208 of an expander graph 108 may be selected.

Using an input seed, the starting vertex selection may be randomly made from among all existing vertices 204, from among a subset of all existing vertices 204, and so forth. Alternatively, the starting vertex may be pre-selected and/or fixed. With the example walk 208W of expander graph 108(2) (of FIG. 2), the starting vertex is 204(0). With the example crawl 208C of expander graph 108(2) (of FIG. 2), the starting vertex is 204(00).

At block 306, the expander graph is explored to encounter other vertices. For example, with an exploration 208 of an expander graph 108, other vertices 204 besides the starting vertex 204 may be encountered so as to collect function values that are associated with encountered vertices. The exploration may take any of many possible forms, including the example crawling of block 306C or the example walking of block 306W.

At block 306C, a crawl is performed on the expander graph. For example, a crawl 208C that embraces vertices 204(01) to 204(03) may be effected on expander graph 108(2) from starting vertex 204(00). An example of crawling on an expander graph is described further herein below with particular reference to FIG. 4, which illustrates a scheme, and FIG. 5, which illustrates a method. At block 306W, a walk is performed on the expander graph. For example, a walk 208W that embraces vertices 204(1) to 204(4) (and beyond) may be effected on expander graph 108(2) from starting vertex 204(0). An example of walking on an expander graph is described further herein below with particular reference to FIG. 6, which illustrates a scheme, and FIG. 7, which illustrates a method.

At block 308, the average of the function values that are associated with encountered vertices is calculated. For example, the average of the function values that are collected by encountering associated vertices 204 during exploration 208 may be determined. This average may be a true average of the collected function values. Because of the randomization properties of the expander graph, this true average of a subset of the total function values is also an approximate average of the total values of the function. The accuracy and precision of the approximation is adjustable, as is described further herein below.

Figure 4:
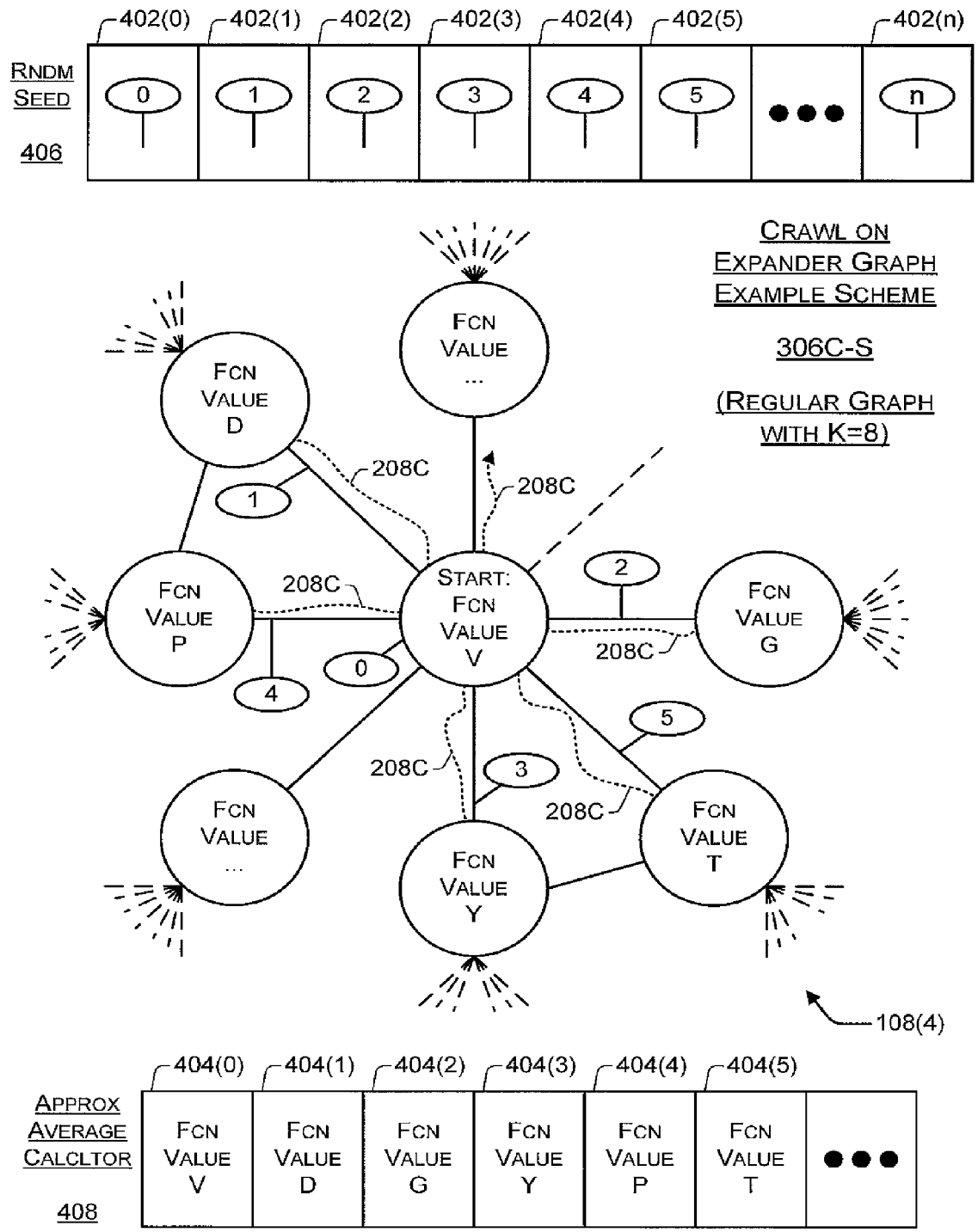
FIG. 4 is a block diagram of an example approximate average calculation scheme that utilizes a crawling exploration of an expander graph.

FIG. 4 is a block diagram of an example approximate average calculation scheme 306C-S that utilizes a crawling exploration of an expander graph 108(4). In other words, example scheme 306C-S illustrates how a crawl 208C on expander graph 108(4) can be used to calculate an approximate average. In addition to expander graph 108(4), example scheme 306C-S also includes a random seed 406 and an approximate average calculator 408. Random seed 406 includes multiple seed chunks 402, and approximate average calculator 408 includes multiple function value entries 404.

Example expander graph 108(4) is a regular graph with k=8. However, expander graphs 108 with other degrees may alternatively be used. The large circles each represent a vertex of expander graph 108(4). The solid lines represent edges that interconnect visible vertices. The large dashed lines represent edges that originate at a visible vertex and terminate on an un-illustrated vertex. Many of the vertices and edges of expander graph 108(4) are not explicitly shown in FIG. 4 due to space limitations.

For the examples of FIGS. 4-7, a function 104 having 26 values is used. These 26 values are represented by the 26 letters of the alphabet: A, B, C, D . . . X, Y, and Z. Of the 26 potential values, six values are explicitly shown as being respectively associated with six vertices. These six values are D, G, P, T, V, and Y. To determine an approximate average of this example alphabet-sized function 104, only a subset of the 26 total potential values is used. The size of this subset is based on a number of factors, including a target additive error $\epsilon$ and a desired confidence level $\gamma$. These factors are addressed more rigorously herein below, especially in the quantitative subsection entitled "Example Quantitative Implementations for Approximate Averaging with Expander Graphs".

Random seed 406 includes a number "n" of seed chunks 402, with "n" being some integer. As illustrated, random seed 406 includes seed chunk 402(0), seed chunk 402(1), seed chunk 402(2), seed chunk 402(3), seed chunk 402(4), seed chunk 402(5) . . . seed chunk 402(n). Each seed chunk 402(0 . . . n) is also graphically represented by a balloon having an integer (0 . . . n) therein. The number of bits of each seed chunk 402 may differ.

In operation, random seed 406 is used to select a next edge for traversing to a next neighbor vertex. In the illustrated example, the starting vertex is randomly selected. Accordingly, as indicated by the 0 balloon in expander graph 108(4), a first seed chunk 402(0) is used to select the starting vertex, which is associated with function value V. Function value V 404(0) is thus provided to approximate average calculator 408 for inclusion in the approximate average calculation.

The next seed chunk, seed chunk 402(1), is then extracted and used to select a next edge, as indicated by the 1 balloon. This selected edge leads to the next selected vertex, which is associated with function value D. Function value D 404(1) is thus provided to approximate average calculator 408. Crawl 208C continues by "returning" to the starting vertex.

The next seed chunk, seed chunk 402(2), is then extracted and used to select a next edge, as indicated by the 2 balloon. This selected edge leads to the next selected vertex, which is associated with function value G. Function value G 404(2) is thus provided to approximate average calculator 408. Crawl 208C continues by returning to the starting vertex.

The next seed chunk, seed chunk 402(3), is then extracted and used to select a next edge, as indicated by the 3 balloon. This selected edge leads to the next selected vertex, which is associated with function value Y. Function value Y 404(3) is thus provided to approximate average calculator 408. Crawl 208C continues by returning to the starting vertex.

In respective order, the next seed chunks, seed chunks 402(4) and 402(5), are then extracted and used to select two additional next edges, as indicated by the 4 and 5 balloons. These selected edges lead to the next selected vertices, which are associated with function values P and T. Function value P 404(4) and function value T 404(5) are thus provided to approximate average calculator 408.

Crawl 208C may continue by returning to the starting vertex, which is associated with function value V. If additional function values are desired for inclusion in the approximate average calculation of approximate average calculator 408 (and additional seed chunks 402 remain), crawl 208C may continue to other vertices. Otherwise, approximate average calculator 408 activates to calculate an approximate average using function value entries 404 that have been selected from expander graph. 108(4).

Figure 5:
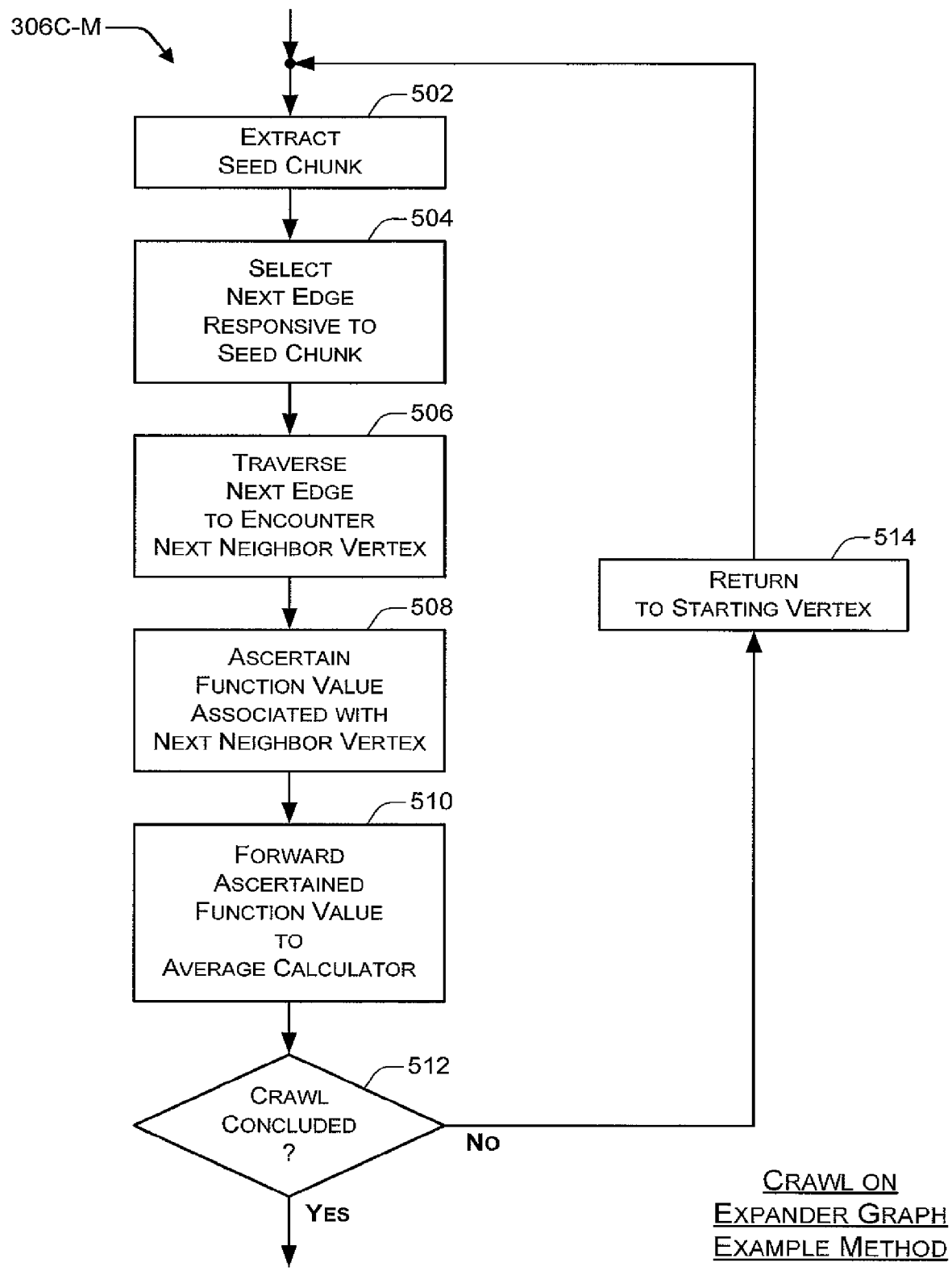
FIG. 5 is a flow diagram that illustrates an example of a method for calculating an approximate average by crawling on an expander graph.

FIG. 5 is a flow diagram 306C-M that illustrates an example of a method for calculating an approximate average by crawling on an expander graph. Flow diagram 306C-M includes seven (7) blocks 502-514. Flow diagram 306C-M illustrates an example method for implementing block 306C (of FIG. 3). In other words, the action(s) of block 304 may precede those of block 502, and the action(s) of block 308 may follow an affirmative decision at block 512.

Although the actions of flow diagram 306C-M may be performed in other environments and with a variety of hardware and software combinations, an approximate average determiner 102 may implement the described actions. Other FIGS. as described herein, and especially FIG. 4, are referenced below to further explain an example of the method.

By way of explanation only, it is given that flow diagram 306C-M begins a current round of crawling at the starting vertex after just returning from the vertex associated with function value Y. At block 502, a seed chunk is extracted. For example, seed chunk 402(4) may be extracted from random seed 406.

At block 504, a next edge is selected responsive to the extracted seed chunk. For example, the edge indicated by the 4 balloon may be selected. At block 506, the next edge is traversed to encounter the next neighbor vertex. For example, crawl 208C may traverse the edge indicated by the 4 balloon.

At block 508, the function value that is associated with the next neighbor vertex is ascertained. For example, the function value P may be ascertained. At block 510, the ascertained function value is forwarded to an average calculator. For example, function value P 404(4) may be forwarded to approximate average calculator 408.

At block 512, it is determined if the crawl is concluded. For example, crawl 208C may be concluded when a sufficient number of function values 404 of function 104 have been forwarded to approximate average calculator 408. As noted above, an example approach to determining a sufficient number of function values 404 is described further herein below in the quantitative section. If the crawl is concluded (as determined at block 512), then the overall method may continue with block 308 (of FIG. 3). If, on the other hand, the crawl is not yet concluded, then at block 514 the crawl returns to the starting vertex prior to the extraction of another seed chunk (at block 502).

Figure 6:
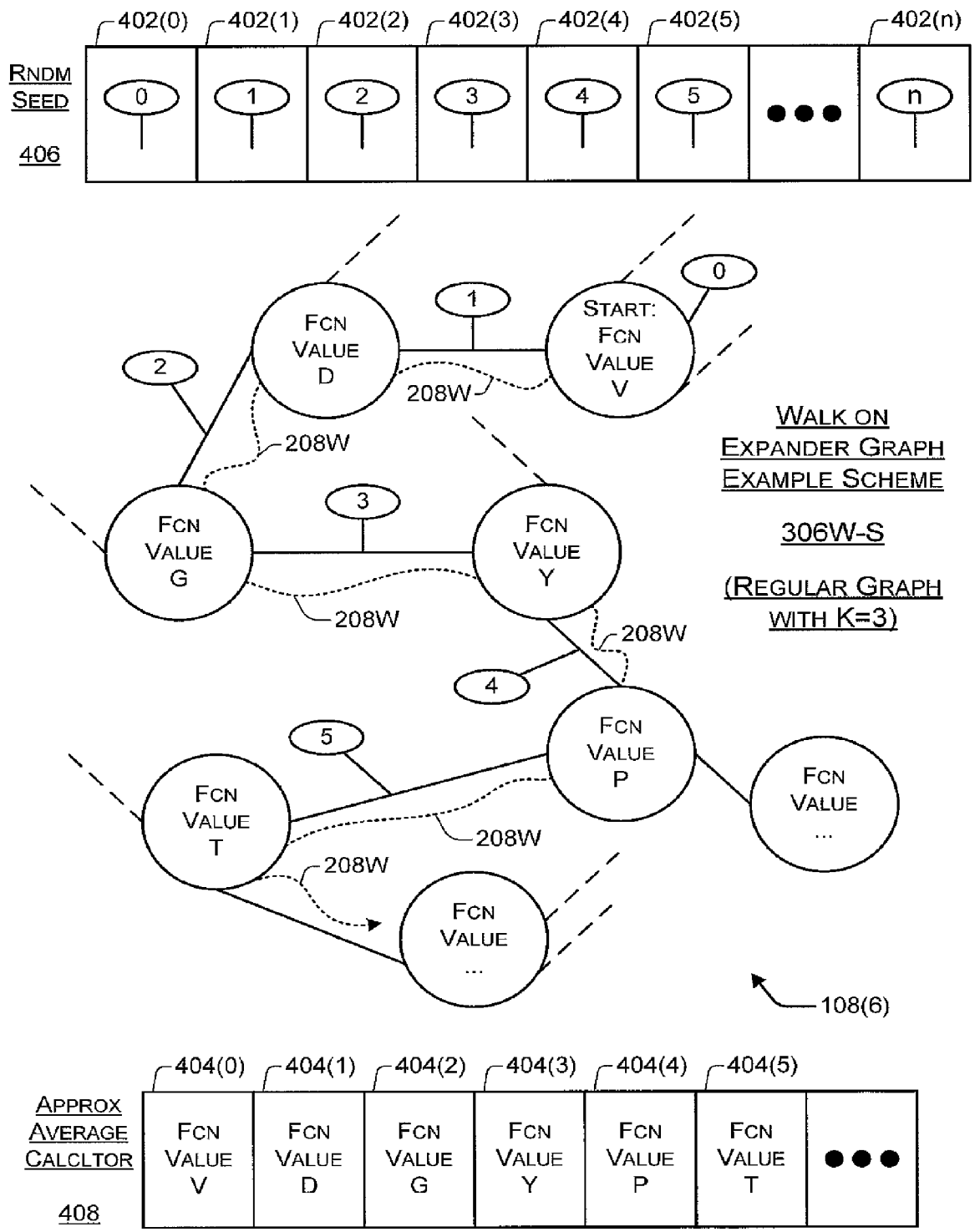
FIG. 6 is a block diagram of an example approximate average calculation scheme that utilizes a walking exploration of an expander graph.

FIG. 6 is a block diagram of an example approximate average calculation scheme 306W-S that utilizes a walking exploration of an expander graph 108(6). In other words, example scheme 306W-S illustrates how a walk 208W on expander graph 108(6) can be used to calculate an approximate average. In addition to expander graph 108(6), example scheme 306W-S also includes random seed 406 and approximate average calculator 408. Random seed 406 includes multiple seed chunks 402, and approximate average calculator 408 includes multiple function value entries 404.

Example expander graph 108(6) is a regular graph with k=3. However, expander graphs 108 with other degrees may alternatively be used. The large circles each represent a vertex of expander graph 108(6). The solid lines represent edges that interconnect visible vertices. The large dashed lines represent edges that originate at a visible vertex and terminate on an un-illustrated vertex. Many of the vertices and edges of expander graph 108(6) are not explicitly shown in FIG. 6 due to space limitations. As described above with particular reference to FIG. 4, a function 104 having 26 alphabetically-represented values is used. Of the 26 potential values, six values (i.e., D, G, P, T, V, and Y) are explicitly shown as being respectively associated with six vertices.

Random seed 406 again includes "n" seed chunks 402(1, 2, 3 ... n). As noted above, the number of bits of each seed chunk 402 may differ. This is particularly true between the crawl and the walk approaches, as there are generally a greater number of edges extending from each vertex with the crawl approach. Consequently, fewer bits of random seed 406 are consumed for each step of a walk.

In operation, random seed 406 is used to select a next edge for traversing to a next vertex. In the illustrated example, the starting vertex is randomly selected. Accordingly, as indicated by the 0 balloon in expander graph 108(6), a first seed chunk 402(0) is used to select the starting vertex, which is associated with function value V. Function value V 404(0) is thus provided to approximate average calculator 408 for inclusion in the approximate average calculation.

The next seed chunk, seed chunk 402(1), is then extracted and used to select a next edge, as indicated by the 1 balloon. This selected edge leads to the next selected vertex, which is associated with function value D. Function value D 404(1) is thus provided to approximate average calculator 408. In contrast to crawl 208C (of FIG. 4), walk 208W continues without "returning" to the starting vertex.

The next seed chunk, seed chunk 402(2), is then extracted and used to select a next edge, as indicated by the 2 balloon. This selected edge leads to the next selected vertex, which is associated with function value G. Function value G 404(2) is thus provided to approximate average calculator 408. Walk 208W continues from the current vertex, which is the one associated with function value G.

The next seed chunk, seed chunk 402(3), is then extracted and used to select a next edge, as indicated by the 3 balloon. This selected edge leads to the next selected vertex, which is associated with function value Y. Function value Y 404(3) is thus provided to approximate average calculator 408. Walk 208W continues from the current vertex.

In respective order, the next seed chunks, seed chunks 402(4) and 402(5), are then extracted and used to select the next two edges, as indicated by the 4 and 5 balloons. These respective selected edges along walk 208W lead to the next respective selected vertices, which are associated with respective function values P and T. Function value P 404(4) and function value T 404(5) are thus provided to approximate average calculator 408.

Walk 208W may continue from the current vertex, which is the one that is associated with function value T. If additional function values are desired for inclusion in the approximate average calculation of approximate average calculator 408 (and additional seed chunks 402 remain), walk 208W may continue to other vertices of expander graph 108(6). Otherwise, approximate average calculator 408 calculates an approximate average of function 104 using function value entries 404 that have been selected from expander graph 108(6).

Figure 7:
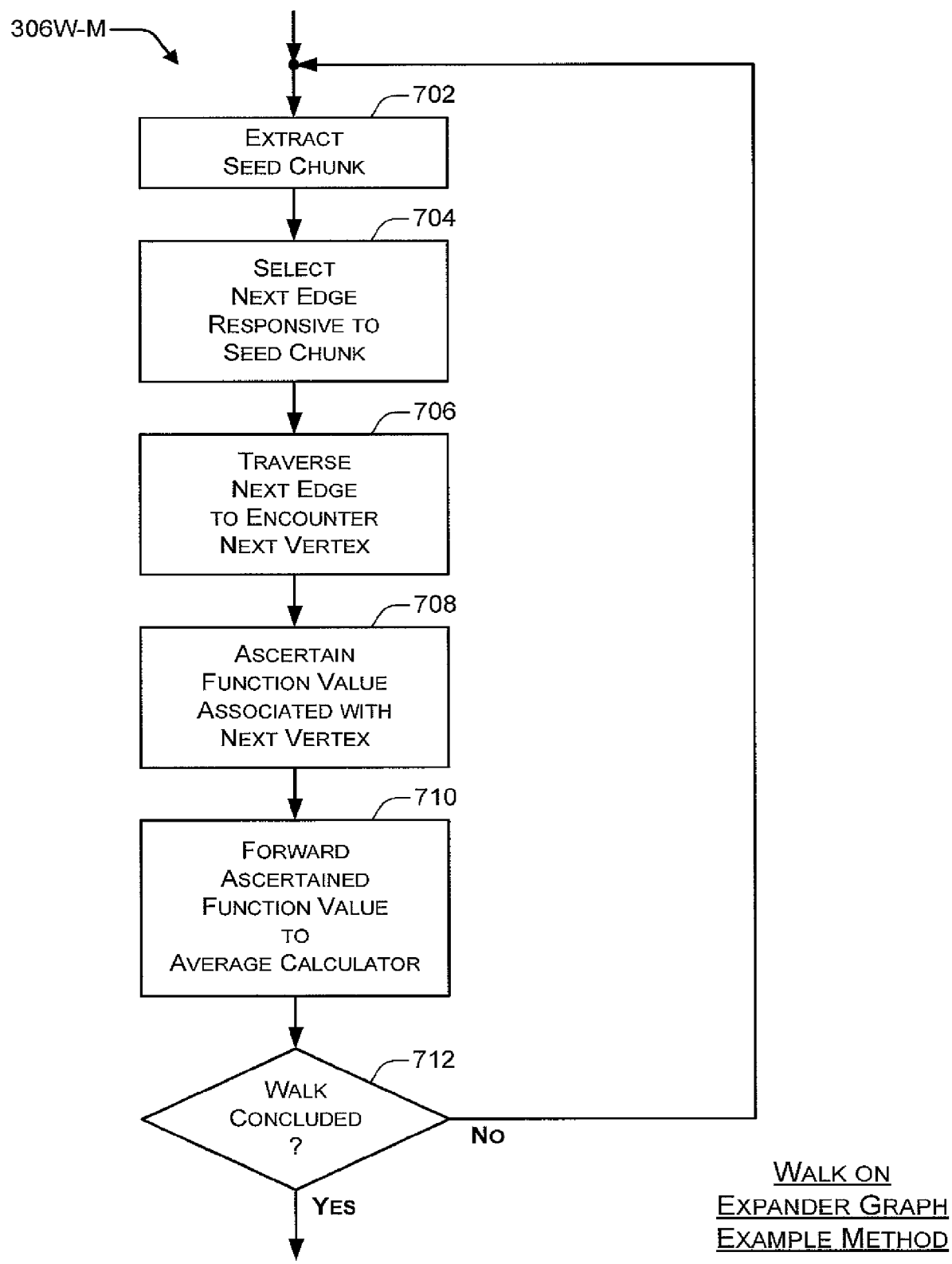
FIG. 7 is a flow diagram that illustrates an example of a method for calculating an approximate average by walking on an expander graph.

FIG. 7 is a flow diagram 306W-M that illustrates an example of a method for calculating an approximate average by walking on an expander graph. Flow diagram 306W-M includes six (6) blocks 702-712. Flow diagram 306W-M illustrates an example method for implementing block 306W (of FIG. 3). In other words, the action(s) of block 304 may precede those of block 702, and the action(s) of block 308 may follow an affirmative decision at block 712.

Although the actions of flow diagram 306W-M may be performed in other environments and with a variety of hardware and software combinations, an approximate average determiner 102 may implement the described actions. Other FIGS. as described herein, and especially FIG. 6, are referenced below to further explain an example of the method.

By way of explanation only, it is given that flow diagram 306W-M begins with a walk 208W being at a current vertex that is associated with function value Y. At block 702, a seed chunk is extracted. For example, seed chunk 402(4) may be extracted from random seed 406.

At block 704, a next edge is selected responsive to the extracted seed chunk. For example, from between/among the edges emanating from the vertex associated with function value Y, the edge indicated by the 4 balloon may be selected. In operation, an association is established between the available edges that emanate from a current vertex and the possible values for a seed chunk 402. The actual value of an extracted seed chunk 402 is used to determine the next edge from among the available edges using the association. At block 706, the next edge is traversed to encounter the next vertex along the walk. For example, walk 208W may take another step by traversing the edge indicated by the 4 balloon to encounter the next vertex.

At block 708, the function value that is associated with the next vertex is ascertained. For example, the function value P may be ascertained. At block 710, the ascertained function value is forwarded to an average calculator. For example, function value P 404(4) may be forwarded to approximate average calculator 408.

At block 712, it is determined if the walk is concluded. For example, walk 208W may be concluded when a sufficient number of function values 404 of function 104 have been forwarded to approximate average calculator 408. As noted above, an example approach to determining a sufficient number of function values 404 is described further herein below in the quantitative section. If the walk is concluded (as determined at block 712), then the overall method may continue with block 308 (of FIG. 3). If, on the other hand, the walk is not yet concluded, then the method of flow diagram 306W-M continues at block 702 by extracting another seed chunk.

Figure 8:
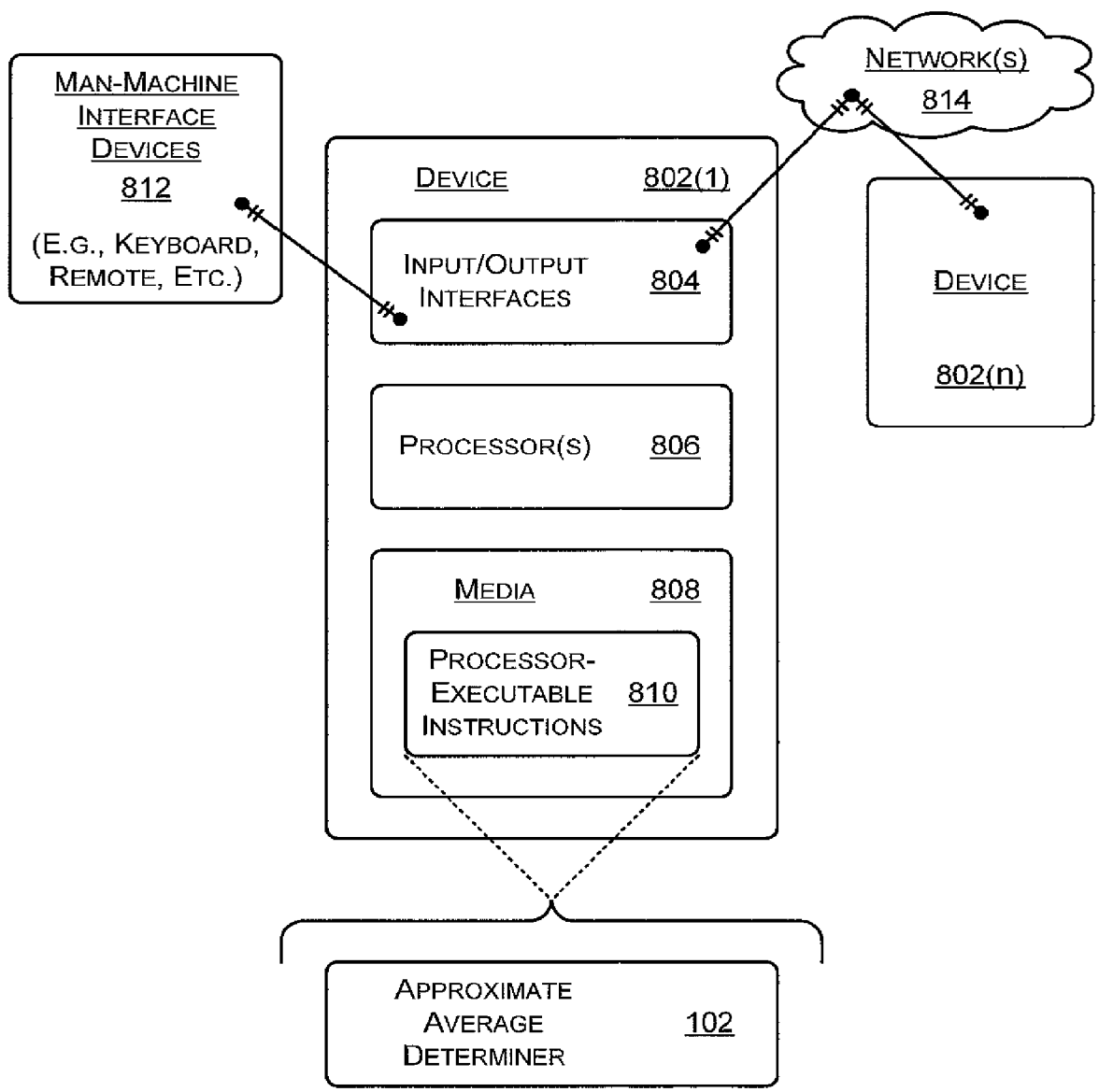
FIG. 8 is a block diagram of an example device that may be employed in conjunction with approximate averaging using an expander graph.

FIG. 8 is a block diagram of an example device 802 that may be employed in conjunction with approximate averaging using an expander graph. For example, a device 802 may execute or otherwise implement an approximate average determiner 102. In certain implementations, devices 802 may be capable of communicating across one or more networks 814. As illustrated two devices 802(1) and 802(n) are capable of engaging in communication exchanges via network 814. Example relevant communication exchanges include those relating to accessing a database server device from a client device.

Generally, device 802 may represent a server device; a storage device; a workstation or other general computer device; a set-top box or other television device; a personal digital assistant (PDA), mobile telephone, or other mobile appliance; some combination thereof; and so forth. As illustrated, device 802 includes one or more input/output (I/O) interfaces 804, at least one processor 806, and one or more media 808. Media 808 includes processor-executable instructions 810. Although not specifically illustrated, device 802 may also include other components.

In a described implementation of device 802, I/O interfaces 804 may include (i) a network interface for communicating across network(s) 814, (ii) a display device interface for displaying information on a display screen, (iii) one or more man-machine device interfaces, and so forth. Examples of (i) network interfaces include a network card, a modem, one or more ports, and so forth. Examples of (ii) display device interfaces include a graphics driver, a graphics card, a hardware or software driver for a screen/television or printer, and so forth. Examples of (iii) man-machine device interfaces include those that communicate by wire or wirelessly to man-machine interface devices 812 (e.g., a keyboard or keypad, a mouse or other graphical pointing device, a remote control, etc.).

Generally, processor 806 is capable of executing, performing, and/or otherwise effectuating processor-executable instructions, such as processor-executable instructions 810. Media 808 is comprised of one or more processor-accessible media. In other words, media 808 may include processor-executable instructions 810 that are executable by processor 806 to effectuate the performance of functions by device 802.

Thus, realizations for approximate averaging using an expander graph may be described in the general context of processor-executable instructions. Generally, processor-executable instructions include routines, programs, applications, coding, modules, protocols, objects, interfaces, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 806 may be implemented using any applicable processing-capable technology. Media 808 may be any available media that is included as part of and/or accessible by device 802. It includes volatile and non-volatile media, removable and non-removable media, and storage and transmission media (e.g., wireless or wired communication channels). For example, media 808 may include one or more disks for longer-term mass storage of processor-executable instructions, random access memory (RAM) for shorter-term storage of instructions that are currently being executed, flash memory for medium to longer term storage, optical disks for portable storage, and/or link(s) on network 814 for transmitting communications, and so forth.

As specifically illustrated, media 808 comprises at least processor-executable instructions 810. Generally, processor-executable instructions 810, when executed by processor 806, enable device 802 to perform the various functions described herein, including those that are illustrated (i) in schemes 306C-S and 306W-S (of FIGS. 4 and 6, respectively) and (ii) in flow diagrams 300, 306C-M, and 306W-M (of FIGS. 3, 5, and 7, respectively).

By way of example only, processor-executable instructions 810 may include all or part of an approximate average determiner 102. Approximate average determiner 102 may be a stand-alone application or it may be part of a larger application, such as a spreadsheet, statistical, or database program. In use, an approximate average determiner 102 may be applied to a spreadsheet column with many entries, to statistical data collected as part of a survey or investigation, to values of a database subject, and so forth.

Example Quantitative Implementations for
Approximate Averaging with Expander Graphs As described qualitatively in the preceding section, approximate averages may be determined using expander graphs. Respective individual function values of a function are associated with respective individual vertices of an expander graph. An expander graph is randomly explored so as to encounter a number of vertices of the expander graph. The function values that are associated with the encountered vertices form a subset of the total values of the function. An approximate average of the function is determined by averaging the subset of function values.

The exploration may be, for example, a crawl or a walk. Regardless of the exploration approach, any given expander graph type may be employed. Example expander graph types include Lubotzky-Philips-Sarnak (LPS) expander graphs and supersingular elliptic curve expander graphs. Hence, a walk or a crawl may be taken on an LPS expander graph. Likewise, a walk or a crawl may be taken on a supersingular elliptic curve expander graph. Quantitative descriptions of walking and crawling on both LPS and supersingular elliptic curve expander graphs are included herein below.

In short, in certain implementations as described herein, the average value of a function is approximated by focused sampling so as to reduce the number of samples to be taken. Instead of picking points completely at random as in other methods of approximating an average, one of the following is implemented: a random vertex on an expander graph is picked and the function is sampled at some of its neighbors; or, the function is evaluated at the vertices of a short random walk on the expander graph.

Thus, in certain implementations as described herein, approximate averaging involves making random explorations on expander graphs. Expander graphs with good expansion properties are particularly adaptable to approximate averaging. One family of expander graphs with good expansion properties are Ramanujan graphs. As noted herein above, approximate averaging with expander graphs may be facilitated using regular graphs. Two example graph types that are both regular and Ramanujan graphs are (i) expander graphs formed from supersingular elliptic curves and (ii) Lubotzky-Philips-Sarnak (LPS) expander graphs. These two example expander graphs are addressed mathematically below in individual subsections.

This and the succeeding paragraph present a concise, relatively non-rigorous explanation of how and why explorations on expander graphs behave in a pseudorandom fashion and generally entail pseudorandom properties. On any k-regular connected graph a random walk, for example, converges to a uniform distribution on the vertices; this means that the likelihood of reaching any vertex given a sufficiently long random walk is the same, equal to one over the number of vertices. The key property of good expander graphs, and among them the Ramanujan graphs are optimal in that regard, is the speed of convergence to that uniform distribution.

Given a probability distribution on the vertices of a k-regular connected graph, namely given for each vertex the likelihood of the process beginning at this vertex, the rate of convergence to the uniform probability distribution is controlled by the size of the gap between the eigenvalue 1 and the other eigenvalues of the normalized adjacency matrix of the graph. For an expander graph, this gap is large enough so that this convergence to the uniform distribution occurs in a logarithm of the number of vertices many steps. The property of the gap between the leading eigenvalue and the others being large is the defining property of Ramanujan graphs, of which the two example graphs described herein are instances. Thus, heuristically, in the example graphs a relatively short (with respect to the number of vertices and degree k) random walk on the graph, as is carried out in one of the processes described herein, shall converge rapidly (relative to the same parameters) to a uniform distribution and so the likelihood of reaching any vertex is close to being the same.

Using Expander Graphs Generally to Determine an Approximate Average

In many situations, the following problem is confronted: A function $f: U \to [0 \ldots 1]$ is defined on a finite set U, and the average value of the function is desired to be computed. In cases in which (i) U is large or (ii) the function $f$ is difficult to compute or has function values that are otherwise difficult to acquire, it is rarely efficient to compute the true average value of the function. Consequently, an approximate average may be determined instead.

One way to determine an approximate value for the average is by random sampling (e.g., using a Monte-Carlo method). With random sampling, a bunch of samples $x_i$, $1 \leq i \leq k$ are picked, and the average value of the function $f$ is approximated on U by the quantity $$\frac{1}{k} \sum_i f(x_i).$$

To compute the average in this way, up to an additive error of $\epsilon$ and with confidence $\gamma$, $k = O(\epsilon^{-2} \log(1-\gamma)^{-1})$ samples need to be taken. If $U = \{0,1\}^m$, then this random sampling requires the use of $O(m\epsilon^{-2} \log(1-\gamma)^{-1})$ random bits.

In contrast, certain implementations as described herein enable an approximate average to be determined with the same confidence $\gamma$ using just $m + O(\log(1-\gamma)^{-1})$ random bits. If $\epsilon$ is very small, this is a considerable saving in the number of random bits that are required. Because the random bits in actual applications are produced by a pseudorandom number generator (which may be computationally expensive), this saving of random bits results in an increase in efficiency since there are far fewer calls to the pseudorandom number generator.

Initially, a set of data for a function is embedded into an expander graph (e.g., a Ramanujan graph). For example, one graph may be used for the embedding of the data set by filling unused additional values with zero (0), but taking care to modify the average definition accordingly. Alternatively, the data set may be exhausted by using a disjoint union of expander graphs.

For the crawling scheme, the set U is initially embedded into an expander graph G (e.g., that is of size $\approx |U|$) such that $U \subseteq V(G)$. Random bits are used to sample a starting vertex v of the graph G. The average value of the function is then computed on $O(\epsilon^{-2}(1-\gamma)^{-1})$ using uniformly random pair-wise independent neighbors of that starting vertex v. More precisely, if the vertices $u_1, u_2, \ldots u_k$ are the neighbors of vertex v, then the following approximate average is output:

$$\frac{1}{k} \sum_i f(u_i).$$

If G is a k-regular Ramanujan graph of size n where $(1-\epsilon')|U| \leq n \leq |U|$, then a floor for k can be set using the following:

$$k \geq \frac{256}{(\epsilon^5(1-\gamma))},$$

with $\epsilon'$ being relatively small.

To pick $O(\epsilon^{-2}(1-\gamma)^{-1})$ pair-wise independent neighbors of vertex v, for example, only $$O\left(\frac{1}{\log \varepsilon} + \frac{1}{\log 1 - \gamma}\right)$$

random bits need be consumed using 2-universal hash functions. Pair-wise independent random strings may be produced as follows. To produce a string of length L over an alphabet of size d (with d much smaller than string L) that is pair-wise independent, a finite field $F_p$ such that p>L is first selected. Second, a and b are picked at random from field $F_p$, which only consumes O(log p) random bits. Third, the values h(i) are enumerated for $1 \leq i \leq L$, where h(x)=ax+b mod d with ax+b being computed in the finite field $F_p$. This is sometimes referred to as a linear congruential scheme.

For the walking scheme, the length of a random walk around an expander graph is O(log N) for a function defined on a set of size N. With a crawling approach, the degree k is relatively large. With a walking approach, the degree k can be relatively smaller, but there is more movement around the graph. Furthermore, the crawling scheme entails "only" pair-wise independent sampling, whereas the random walking involves mutually independent random bits and therefore consumes more bits of a random seed. The better approach may depend on the computational ease of handling a large degree expander graph with less inter-vertex movement versus moving around to many different vertices in a smaller degree expander graph.

Supersingular Elliptic Curve Expander Graphs

An example family of supersingular elliptic curve expander graphs is defined as follows. It is given that p is a prime number and that l($\neq$p) is another prime number. The graph G(p, l) has as its vertex set V the set of supersingular j-invariants over the finite field $F_{p^2}$. There is an edge between the vertex $j_1$ and $j_2$ if there is an isogeny of degree l between the supersingular elliptic curves whose j-invariants are $j_1$ and $j_2$. The graph G(p, l) is therefore established to be an example of an l+1 regular Ramanujan graph. The following paragraphs of this subsection describe the construction of an approximate average determiner 102 that uses explorations of supersingular elliptic curve expander graphs. Thus, this entails describing how to navigate the graph G(p, l).

The graph is constructed as follows. It is given that $j_0, \ldots, j_{k-1}$ are the vertices of the graph G(p, l). Because the number of vertices, k, of the graph is equal to the class number of the definite quaternion algebra ramified only at p and at infinity, only $\log_2(k)$ bits are needed to specify a vertex. However, the j-invariants are given a priori as elements of $F_{p^2}$ written as a pair (a,b) of elements of $F_p$. The j-invariant may be considered as a pair of natural numbers (a,b) mod p. Applying, e.g., a 2-universal hash function to the concatenation of a and b produces a bit string of length ceil($\log_2(2k)$)+1.

More specifically, although there are k vertices, the names for the vertices occupy 2 log p bits instead of log k bits. Because the number of vertices is known a priori, an appropriate hash function can be applied to reduce the number of bits consumed by the names of the vertices. The result of applying such a universal hash function is called u, and the vertices of the graph are relabeled $u(j_0), \ldots u(j_{k-1})$.

Generally, the graph is explored for a walk to generate a subset of the total function values of a function 104 as follows. It is given that $\sigma$ is the seed of the pseudorandom number generator and that s is the number of steps that can be taken for the walk. While log k bits of the seed $\sigma$ are used to determine the starting vertex, h bits of the seed $\sigma$ are consumed at each step. (If the starting vertex is fixed, then it can be assumed that $\sigma$ is of length h*s.) The value of $\sigma$ is considered to be an element of $\{0,1\}^{h*s+\log_2(k)}$ (i.e., a string of 0's and 1's of length h*s+$\log_2$(k), where h=ceil($\log_2$(l+1))+1). It is also given that $\sigma_0$ is the first $\log_2$(k) bits of $\sigma$.

An output having a string of respective vertices, to which respective function values are associated, is produced with an input of the seed $\sigma$: In stage 0, the starting vertex is $v_0=j_{\sigma_0}$, and the output is $\sigma_0$. At stage i, for 0<i≤s, the block of h-bits $\sigma_i$ of $\sigma$ starting from the (h*(i−1)+$\log_2$(k)+1)-th bit to the (h*i+$\log_2$(k))-th bit is used to determine the next vertex in the graph as follows. Because G(p, l) is an l+1 regular graph the vertex $v_{i-1}$ has l+1 edges emanating from it. These edges are labeled from 0 through l. The seed chunk $\sigma_i$ is used to determine which edge is traversed from the vertex $v_{i-1}$ to $v_i$. If the vertex $v_i$ is the supersingular elliptic curve with j-invariant $j_r$, the next vertex that is output at stage i is defined to be $u(j_r)$.

A specific mathematical approach to taking a walk around a supersingular elliptic curve expander graph is as follows. For the expander graph whose nodes are supersingular elliptic curves modulo a prime p, and its edges are isogenies of degree l between elliptic curves, the steps of a walk around the graph can be taken as follows:

Beginning at a node corresponding to the elliptic curve E, first find generators P and Q of the l-torsion of E[l]. To this end:
1. Let n be such that $F_q(E[l]) \subseteq F_{q^n}$.
2. Let S=éE($F_{q^n}$), the number of $F_{q^n}$ rational points on E.
3. Set s=S/$l^k$, where $l^k$ is the largest power of l that divides S (note k≥2).
4. Pick two points P and Q at random from E[l]:
   (a) Pick two points U, V at random from E($F_{q^n}$).
   (b) Set P'=sU and Q'=sV, if either P' or Q' equals O then repeat step (a).
   (c) Find the smallest $i_1, i_2$ such that $l^{i_1}P' \neq O$ and $l^{i_1}P' \neq O$ but $l^{i_1+1}P'=O$ and $l^{i_2+1}Q'=O$.
   (d) Set P=$l^{i_1}$P' and Q=$l^{i_2}$Q'.
5. Using the well-known Shanks's Baby-steps-Giant-steps algorithm, determine if Q belongs to the group generated by P. If so, step (4) is repeated.

The j-invariants in $F_{p^2}$ of the t+1 elliptic curves that are isogenous to E are $j_1, \ldots j_{l+1}$. They can be found as follows:
(a) Let $G_1$=<Q> and $G_{1+i}$=<P+(i−1)*Q> for $1 \leq i \leq l$.
(b) For each i, $1 \leq i \leq l+1$ compute the j-invariant of the elliptic curve E/$G_i$ using Vélu's formulas.

If the graph of supersingular elliptic curves with 2-isogenies is used, for example, a random walk can be taken in the following explicit way: at each step, after finding the three non-trivial 2-torsion points of E, they are ordered in terms of their x-coordinates in a pre-specified manner. The input bits are then used to determine which point to select to quotient the elliptic curve by in order to get to the next vertex or node in the walk.

Lubotzky-Philips-Sarnak (LPS) Expander Graphs

Another Ramanujan graph that may be used by an approximate average determiner is the Lubotzky-Philips-Sarnak (LPS) expander graph. This example expander graph is described in relative detail in this subsection. The construction of an LPS expander graph is accomplished as follows. It is given that l and p are two distinct primes, with l a relatively small prime and p a relatively large prime. It is also established that p and l are≡1 mod 4 and that the l is a quadratic residue mod p (i.e., that $l^{(p-1)/2} \equiv 1$ mod p). The LPS graph, with parameters l and p, is denoted by $X_{l,p}$.

The vertices that make up the graph $X_{l,p}$ are defined as follows. The vertices of $X_{l,p}$ are the matrices in a projective special linear (PSL) group. More specifically, the vertices of $X_{l,p}$ are the matrices in PSL$(2,F_p)$, which are invertible 2×2 matrices with entries in $F_p$ that have a determinant of 1 together with the equivalence relation A=−A for any matrix A. Given a 2×2 matrix A with determinant 1, the name for the vertex is the 4-tuple of entries of A or −A, depending on which is lexicographically smaller in the usual ordering of the set $\{0, \ldots, p-1\}^4$.

The edges that make up the graph $X_{l,p}$ are defined as follows. Each matrix A is connected to the matrices $g_iA$ where the $g_i$'s are the following explicitly defined matrices: It is given that I is an integer satisfying $I^2 \equiv -1$ mod p. There are exactly 8(l+1) solutions $g=(g_0, g_1, g_2, g_3)$ to the equation $g_0^2+g_1^2+g_2^2+g_3^2=l$. Among these 8(l+1) solutions, there are exactly l+1 with (i) $g_0$ both >0 and odd and (ii) $g_j$ even for j=1, 2, 3 . . . .

To each such g, the following matrix is associated:

$$\begin{bmatrix} g_0 + Ig_1 & g_2 + Ig_3 \\ -g_2 + Ig_3 & g_0 - Ig_1 \end{bmatrix}.$$

This results in a set S of l+1 matrices in PSL$(2,F_p)$. The $g_i$'s are the matrices in this set S. Under these constraints, if g is in S, then so is $g^{-1}$. Furthermore, because l is small, the set of matrices in S can be found by exhaustive search very quickly. Each possible seed chunk value can therefore be associated with each edge that corresponds to a directly-connected matrix $g_iA$, with g being in the set S. The actual value of an extracted seed chunk can be used to select the associated edge and thus determine the next edge to be traversed to the next vertex, with the next vertex corresponding to a matrix with a 4-tuple name. The data value that is associated with that vertex is then output as one entry to be used to calculate the average.

Example Mathematical Implementation

The following mathematical example is presented by way of explanation only. It pertains to the crawling scheme with an LPS expander graph. It is given that $f:\{0,1\}^m \to [0 \ldots 1]$ is a function whose output is a rational number between 0 and 1. The procedure below enables the average value of $f$ to be determined within an additive error to the hundredths ($\epsilon$=0.01) and 90% confidence ($\gamma$=0.9). In accordance with the guidance described above (e.g., $k \geq 256/(\epsilon^5(1-\gamma))$, a Ramanujan graph with degree k≈25.6×10^{12} is utilized. Two primes are used: a prime l≥k and a prime p≈$2^m$. It is assumed that p is much larger than k. A set of generators for the graph $X_{l,p}$ are computed as described in the paragraphs herein above concerning the construction of an LPS graph $X_{l,p}$. To compute the approximate average of $f$, two random strings $s_1$ and $s_2$ are selected. Specifically, string $s_1$ is of length m, and string $s_2$ is of length 874(=log(8/$\epsilon^2$(1−$\gamma$))×log(256/$\epsilon^5$(1−$\gamma$))).

A 2-universal hash function is used to stretch $s_2$ to $s_3$ of length 800000(=8/$\epsilon^2$(1−$\gamma$)) on an alphabet of size k. Next, string $s_1$ is used to pick a vertex v of $X_{l,p}$. String $s_3$ is then used to take a pair-wise random set of the neighbors of size 800000. Because the string $s_3$ is over an alphabet of size k, each letter can be used to determine a generator $g_i$ using the letter to determine the index i. The neighbor of vertex v corresponding to this letter is v*$g_i$ with the product being computed in the group PSL$(2,F_p)$. The average of this set is calculated, and this calculated average is output as the approximate average of the function. It should be understood that the example values provided above are worst-case values. In practice, one can take a shorter walk or smaller degree expander and still get good estimates for the average.

Approximating General Function Properties with Expander Graphs

Using expander graphs to determine an approximate attribute of a function/data set is not limited to approximating averages. Instead, expander graphs may be used to determine general properties of the distribution of values of a function. These general properties of functions include, but are not limited to, the variance, the standard deviation, the mean, higher ($k^{th}$) order moments about the mean, other statistical values, and so forth. From one perspective, explorations (e.g., walks, crawls, etc.) of expander graphs build an approximation of the distribution of the function on the data set that is associated with vertices of the expander graph that are encountered during the exploration. Hence, any property that can be determined from this approximate distribution can thereby be approximated using an expander graph exploration.

The devices, actions, aspects, features, functions, procedures, modules, data structures, schemes, methods, architectures, components, etc. of FIGS. 1-8 are illustrated in diagrams that are divided into multiple blocks. However, the order, interconnections, interrelationships, layout, etc. in which FIGS. 1-8 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for approximate averaging using an expander graph.

Although systems, media, devices, methods, procedures, apparatuses, techniques, schemes, approaches, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method comprising:
   storing, in a memory storage media communicatively coupled to a processor, processor-executable instructions for performing the method;
   executing the instructions on the processor;
   according to the instructions being executed:
   associating respective values of a function with respective vertices of an expander graph;
   exploring the expander graph to encounter multiple vertices;
   ascertaining respective function values that are associated with respective ones of the multiple encountered vertices; and
   calculating a property of the ascertained function values.

2. The method as recited in claim 1, further comprising:
   forwarding the property of the ascertained function values as an approximation of the property for the function.

3. The method as recited in claim 1, wherein the expander graph comprises a Ramanujan expander graph.

4. The method as recited in claim 1, wherein the expander graph comprises a Lubotzky-Philips-Sarnak (LPS) expander graph or a supersingular elliptic curve expander graph.

5. The method as recited in claim 1, wherein the property of the ascertained function values comprises at least one of a variance, a standard deviation, a mean, or a higher ($k^{th}$) order moment about the mean.

6. The method as recited in claim 1, wherein the exploring comprises:
walking on the expander graph; or
crawling on the expander graph.

7. The method as recited in claim 1, wherein the exploring comprises:
from a current vertex, traversing a next edge responsive to a seed chunk to encounter a next vertex, which becomes a new current vertex.

8. The method as recited in claim 1, wherein the exploring comprises:
selecting a starting vertex from the expander graph; and
from the starting vertex, traversing multiple edges to encounter multiple vertices that are directly connected to the starting vertex.

9. One or more processor-accessible storage media comprising processor-executable instructions that include an approximate average determiner that determines an approximate average of a function using an expander graph having multiple vertices and interconnecting edges.

10. The one or more processor-accessible storage media as recited in claim 9, wherein the approximate average determiner establishes an association between respective values of the function and respective vertices of the expander graph, and wherein the approximate average determiner explores the expander graph to encounter vertices of the expander graph.

11. The one or more processor-accessible storage media as recited in claim 10, wherein the approximate average determiner ascertains values of the function that are associated with the encountered vertices and calculates an average of the ascertained values of the function to produce an approximate average of the function.

12. The one or more processor-accessible storage media as recited in claim 9, wherein the approximate average determiner establishes an association between respective values of the function and respective vertices of the expander graph, and wherein the approximate average determiner crawls around the expander graph to encounter vertices that are neighbor vertices of a vertex of the expander graph from which the crawl starts.

13. The one or more processor-accessible storage media as recited in claim 9, wherein the approximate average determiner establishes an association between respective values of the function and respective vertices of the expander graph, and wherein the approximate average determiner walks over the expander graph to encounter a number of vertices in accordance with a random seed.

14. The one or more processor-accessible storage media as recited in claim 9, wherein at least one parameter of the expander graph is set responsive to an additive error and a confidence level.

15. The one or more processor-accessible storage media as recited in claim 14, wherein a number of edges per vertex in a k-regular graph is set responsive to $k \geq 256/(\epsilon^5(1-\gamma))$, with $\epsilon$ representing the additive error and $\gamma$ representing the confidence level.

16. The one or more processor-accessible storage media as recited in claim 9, wherein the processor-executable instructions comprise at least part of a database program, a spreadsheet program, or a statistical program.

17. A device comprising:
an expander graph having vertices that are interconnected by edges, each vertex connected by edges to at least two other vertices;
a function having values; and
an approximate average determiner to associate the values of the function to the vertices of the expander graph, wherein the approximate average determiner encounters multiple vertices of the expander graph by exploring the expander graph responsive to a random seed and produces an approximate average for the function based on the values of the function that are associated with the multiple vertices that are encountered.

18. The device as recited in claim 17, wherein the approximate average determiner produces the approximate average for the function by averaging the values of the function that are associated with the multiple vertices that are encountered during the exploration of the expander graph.

19. The device as recited in claim 17, wherein the approximate average determiner explores the expander graph by crawling on the expander graph by implementing actions comprising:
extracting a seed chunk;
selecting a next edge responsive to the extracted seed chunk;
traversing from a starting vertex the selected next edge to encounter a next neighbor vertex;
ascertaining a function value associated with the encountered next neighbor vertex;
forwarding the ascertained function value to an average calculator; and
if the crawling is not concluded, returning to the starting vertex at least prior to repeating the traversing action.

20. The device as recited in claim 17, wherein the approximate average determiner explores the expander graph by walking on the expander graph by implementing actions comprising:
extracting a seed chunk;
selecting a next edge responsive to the extracted seed chunk;
traversing from a current vertex the selected next edge to encounter a next vertex;
ascertaining a function value associated with the encountered next vertex; and
forwarding the ascertained function value to an average calculator.

* * * * *